No. 816,916. PATENTED APR. 3, 1906.
H. E. KEELER.
SASH ADJUSTER.
APPLICATION FILED AUG. 29, 1905.
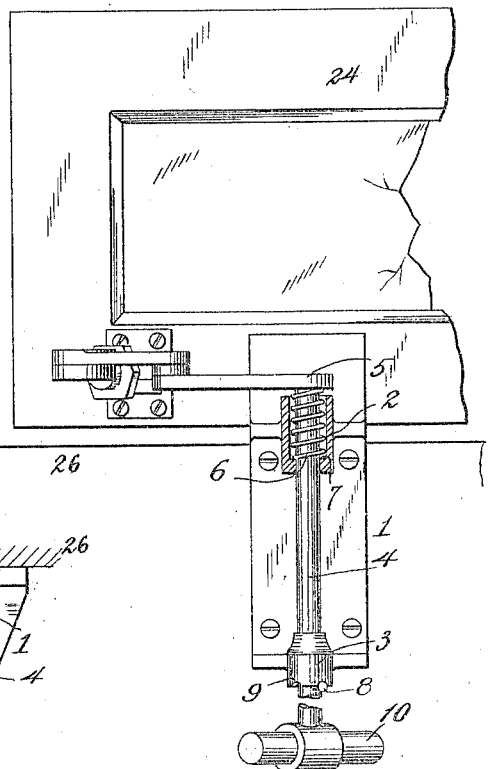
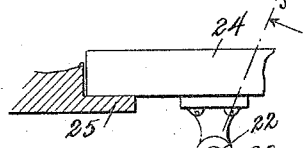
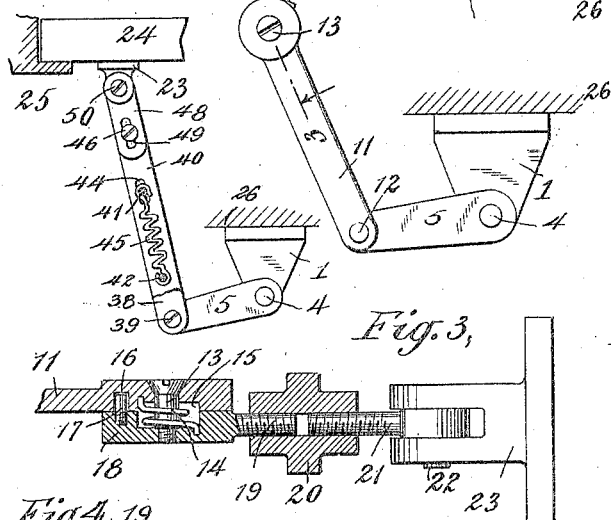
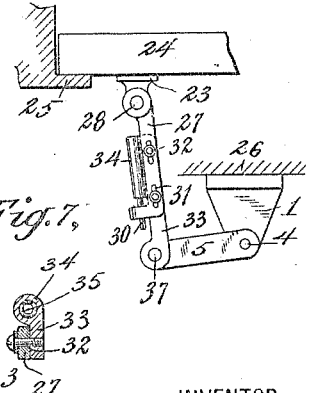
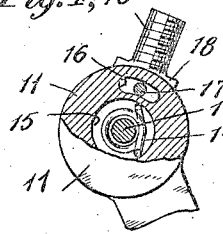
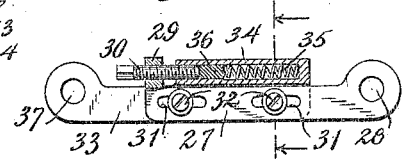
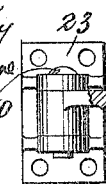
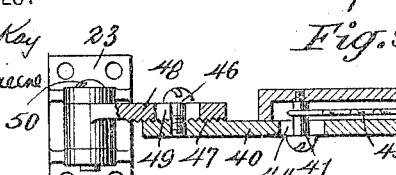
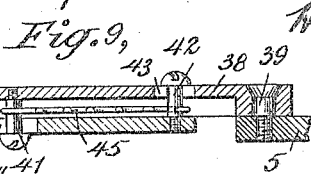
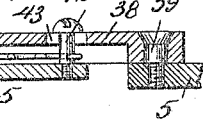
WITNESSES:
Jessie B. Kay
Josephine A. Greene
INVENTOR
Herbert E. Keeler
BY Duncan & Duncan
ATTORNEYS

UNITED STATES PATENT OFFICE.

HERBERT E. KEELER, OF NEW YORK, N. Y.

SASH-ADJUSTER.

No. 816,916.      Specification of Letters Patent.      Patented April 3, 1906.

Application filed August 29, 1905. Serial No. 276,215.

*To all whom it may concern:*

Be it known that I, HERBERT E. KEELER, a citizen of the United States, and a resident of New York city, in the county and State of New York, have invented certain new and useful Improvements in Sash-Adjusters, of which the following is a specification, taken in connection with the accompanying drawings.

This invention relates to sash-adjusters, and relates especially to devices for adjusting the deck-sashes of railway-cars and securely holding them in closed position.

In the accompanying drawings, showing illustrative embodiments of this invention, Figure 1 is a front view of one form. Fig. 2 is a corresponding top view. Fig. 3 is an enlarged section on the line 3 3 of Fig. 2. Fig. 4 is a sectional detail of the same. Fig. 5 is a top view showing another form. Fig. 6 is an enlarged top view of part of the same. Fig. 7 is a transverse sectional view of the same on the line 7 7 of Fig. 6. Fig. 8 is a top view showing still another embodiment, and Fig. 9 is an enlarged detailed section of the same.

In the illustrative embodiments of this invention shown in the drawings a sash 24, which may be of the ordinary side-hinged type, is shown as coöperating with the sash-frame 25. The bracket 1 may be secured to the car-body 26 in any desired way adjacent this sash and is formed with the projecting bearing-sleeves 2 and 3. The sleeve 2 may be provided with an enlarged hole 7 in its upper portion in which the spring 6 may be located to normally force the stem 4 upward. This stem or actuating-rod may be provided at its lower end with the transverse handle 10 and may be formed with a projecting pin 8, adapted to coöperate with the notches 9 in the adjacent sleeve, these devices constituting illustrative retaining devices for yieldingly retaining the actuating-rod in adjusted position. Between the stem and the sash adjustable spring-yielding connections are arranged which preferably comprise a fastening to be readily secured or applied to the sash from the inside of the car and a suitable crank upon the stem.

The crank 5 may be rigidly secured to the upper end of the stem 4 and may have the pivot 12 in its outer end. The fastening 23, having the pivot 22, may be adapted to be readily screwed onto the inner face of the sash 24, which may be conveniently done from the inside of the car. Between these two pivots an adjustable spring-yielding connector is preferably arranged, and this connector may comprise the link 11, (shown in Figs. 2 and 3,) secured to the pivot 12 and formed with a head at its other end engaging the pivot 13, which connects it with the head 14 of the union. The threaded stud 19 is secured to the head 18 and a similar stud 21 is formed with a suitable lug to engage the pivot 22. The threads on these two studs are right and left handed, as shown, and coöperate with the adjusting means in the form of the nut 20, so that by this means the length of the union may be readily adjusted to the extent desired. The head 18 is formed with a suitable cavity, so as to provide the spring-cavity 15 in these two engaging heads. A spiral spring 14 is shown as located in this cavity around the pivot 13 and having each end secured to one of the heads. The stop-pin 17 is secured to one of these heads and loosely plays in a suitable slot 16 in the other head, so that parts of this toggle-connector are loosely held or pivoted together and are allowed a limited toggle movement about the pivot 15. When in the closed position indicated, the toggle-spring which normally tends to shut these two parts of the connector together is brought into action, so as to exert a spring-yielding action and hold the sash firmly in closed position.

The parts of the connector may have a loosely sliding instead of a pivoted connection, if desired, as is shown in Figs. 5 and 6. The link 33 may engage the pivot 37 of the crank at one end and be provided with the pins 32, which engage suitable slots 31 in the union 27, this member being connected with the pivot 28 of the fastening 23. A casing 34 may be formed on the link to accommodate the spring 35, which acts upon the member 36, connected with the union, and, if desired, a suitable adjustment may be provided by mounting a screw or threaded pin in the threaded lug 29, so as to adjustably engage the member 36, although this pin need not be threaded under all circumstances.

As indicated in Figs. 8 and 9, the link 38 may be connected to the pivot 39 on the crank 5 and may be inclosed in the form of a housing having a sliding engagement with the bar 40 through a pin-and-slot connection, the pin 41 on the link engaging the slot 44 in the bar, and the pin 42 on the bar engaging the slot 43 in the link. A suitable reflexed spring 45 may be mounted between these two pins, as indicated, so as to give this connector a spring-yielding character, if desired, If desired, also, the connector may be made adjustable by forming suitable grips or projections 47 on the bar and by providing the stud 48 with coöperating projections. This stud is formed with the hole or slot 49, which accommodates the adjusting member or bolt 46, so that these two parts may be readily held in adjusted position and form an adjustable union. The lug at the end of the stud is shown as pivotally engaging the fastening 23 by means of the pivot 50.

It is manifestly unnecessary to make the connector both adjustable and spring-yielding in all cases; but this is advantageous under some circumstances. It is of course obvious that in assembling these devices after the bracket and actuating means have been secured in position the fastening may be readily secured to the sash from the inside of the car. Thereafter if the parts are not in correct position a suitable adjustment may be made in the connector or under some circumstances the spring-yielding character of this connector may suffice to make up for any slight inaccuracies in putting up the device.

Having described this invention in connection with several illustrative embodiments of the same to the details of which I do not desire to be limited, what I claim as new, and what I desire to secure by Letters Patent, is set forth in the appended claims.

I claim—

1. In sash-adjusters, a bracket provided with bearing-sleeves, an actuating-rod mounted in said bracket, retaining devices to yieldably hold said actuating-rod in position, a crank secured to said rod, a fastening provided with means to apply the same to a sash from the inside of the car, and an adjustable spring-yielding connector pivoted to said crank and said fastening, said connector comprising an inclosed link, a bar having a limited pin-and-slot connection with said link, a reflexed spring between said bar and said link, grips on said bar, a stud provided with coöperating grips and fastening means to secure said stud and bar together in adjusted position.

2. In sash-adjusters, a bracket provided with bearing-sleeves, an actuating-rod mounted in said bracket, retaining devices to yieldably hold said actuating-rod in position, a crank secured to said rod, a fastening provided with means to apply the same to a sash from the inside of the car, and an adjustable spring-yielding connector pivoted to said crank and fastening, said connector comprising a link, a bar having a limited pin-and-slot connection with said link, a reflexed spring between said bar and link, a stud and adjusting means to adjustably secure said stud and said bar together.

3. In sash-adjusters, a bracket provided with bearing-sleeves, an actuating-rod mounted in said bracket, retaining devices to yieldably hold said actuating-rod in position, a crank secured to said rod, a fastening provided with means to apply the same to a sash from the inside of the car, and a connector pivoted to said crank and said fastening and comprising a link and an adjustable union having a limited pin-and-slot connection with said link and a spring between said union and said link.

4. In sash-adjusters, a bracket provided with bearing-sleeves, an actuating-rod mounted in said bracket, retaining devices to yieldably hold said actuating-rod in position, a crank secured to said rod, a fastening provided with means to apply the same to a sash from the inside of the car, and an adjustable spring-yielding connector between said crank and said fastening comprising a link and an adjustable union slidingly connected with said link and a spring between said union and said link.

5. In sash-adjusters, a bracket provided with bearing-sleeves, an actuating-rod mounted in said bracket, retaining devices to yieldably hold said actuating-rod in position, a crank secured to said rod, a fastening provided with means to apply the same to a sash from the inside of the car, and a spring-yielding connector between said crank and said fastening comprising a link and a union loosely connected with said link and a spring between said union and said link.

6. In sash-adjusters, a bracket, guiding-sleeves on said bracket and a rotary actuating-rod in said sleeves, a fastening to be applied to a sash from one side of the same and adjustable connections between said fastening and said actuating-rod, comprising a link, a bar having a pin-and-slot connection with said link a spring between said bar and said link, a stud and adjusting means to hold said stud and bar in adjusted position.

7. In sash-adjusters, a bracket, guiding-sleeves on said bracket an actuating-rod in said sleeves, a fastening adapted to be applied to a sash from one side of the same and adjustable spring-yielding connections between said fastening and said actuating-rod.

8. In sash-adjusters, a bracket provided with bearing-sleeves, an actuating-rod having an operating-handle on its depending end, mounted in said bracket, retaining devices to yieldably hold said actuating-rod in position, a crank secured to said rod, a fastening provided with means to apply the same to a sash from the inside of the car, and an adjustable connector between said crank and said fastening comprising a plurality of members and adjusting means to hold said members together in adjusted position.

9. In sash-adjusters, a bracket provided with bearing-sleeves, an actuating-rod having an operating-handle on its depending end, mounted in said bracket, retaining devices to yieldably hold said actuating-rod in position, a crank secured to said rod, a fastening provided with means to apply the same to a sash from the inside of car, and an adjustable connector between said crank and said fastening comprising a plurality of members provided with coöperating corrugated grips and screw-adjusting means to hold said members together in adjusted position.

10. In sash-adjusters, an adjustable spring-yielding connector comprising a link, a bar having a limited pin-and-slot connection with said link, a spring between said bar and said link, grips on said bar, a stud having grips and adjusting means to hold said stud and bar in adjusted position.

11. In sash-adjusters, a connector comprising a link, a bar having a pin-and-slot connection with said link a spring between said bar and said link, a stud and adjusting means to hold said stud and bar in adjusted position.

HERBERT E. KEELER.

Witnesses:
HARRY L. DUNCAN,
JAMES M. CARLOW.